US012335265B2

(12) United States Patent
    Michel

(10) Patent No.: US 12,335,265 B2
(45) Date of Patent: Jun. 17, 2025

(54) DISABLING EXECUTABLE INSTRUCTIONS FROM A NETWORK MESSAGE

(71) Applicant: Dell Products L.P., Round Rock, TX (US)

(72) Inventor: Ruben I. Michel, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 18/105,360

(22) Filed: Feb. 3, 2023

(65) Prior Publication Data

US 2024/0267379 A1     Aug. 8, 2024

(51) Int. Cl.
    *H04L 9/40* (2022.01)
(52) U.S. Cl.
    CPC ............ *H04L 63/10* (2013.01); *H04L 63/123* (2013.01)
(58) Field of Classification Search
    CPC .............................. H04L 63/10; H04L 63/123
    See application file for complete search history.

(56) References Cited

U.S. PATENT DOCUMENTS

| | | | |
|---|---|---|---|
| 9,113,358 B1* | 8/2015 | Lachwani | H04L 43/50 |
| 9,979,648 B1* | 5/2018 | Singh | H04L 45/7453 |
| 11,102,244 B1* | 8/2021 | Jakobsson | H04L 51/42 |
| 2006/0046693 A1* | 3/2006 | Tran | H04L 63/0853 455/411 |
| 2007/0271341 A1* | 11/2007 | Kumar | G06Q 10/107 709/206 |
| 2009/0260087 A1* | 10/2009 | Ishida | H04L 63/145 726/25 |
| 2015/0271121 A1* | 9/2015 | Wells | H04L 51/214 709/206 |

* cited by examiner

*Primary Examiner* — Vance M Little
(74) *Attorney, Agent, or Firm* — Krishnendu Gupta; Nikhil Patel

(57) ABSTRACT

One or more aspects of the present disclosure relate to disabling executable instructions from a network message. In embodiments, a message can be received at a server. In addition, one or more executable instructions can be disabled from the message. Further, the message with the disabled one or more executable instructions can be processed.

18 Claims, 4 Drawing Sheets

DISABLING EXECUTABLE INSTRUCTIONS FROM A NETWORK MESSAGE

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to extending the endurance of flash media. In embodiments, a message is received at a server. In addition, one or more executable instructions are disabled from the message. Further, the message with the disabled one or more executable instructions is processed.

In embodiments, the message can be received from an authenticated client. For example, the authenticated client can correspond to the one whose corresponding message includes valid client credentials.

In embodiments, the message can subscribe to a predetermined format.

In embodiments, the message can be received at a Web Application Resource (WAR) interceptor. Subsequently, the message can be redirected to a message converter. Further, a security bean can be injected into the message converter using an inversion-of-control (IOC) framework. For example, the IOC framework can include a Contexts and Dependency Injection (CDI) subsystem In embodiments, the message can be serialized into a serialized message object. For example, the serialized object can be a server messaging class instance.

In embodiments, the serialized message object can be analyzed using the security bean. Further, auto-executable instructions in the serialized object can be disabled.

In embodiments, each class object in the serialized message object can be examined using the security bean.

In embodiments, each field can be identified along an inheritance hierarchy for each class object. For example, identifying each field can include identifying each field's type. Further, each field can be recursively processed based on the structure of each field's type.

In embodiments, characters from fields corresponding to one or more predetermined field types can be removed. For example, the predetermined field types can include container field types, and the container field types can include linked hash maps. Further, each container field type can be recursively processed.

In embodiments, character removal from fields matching one or more predetermined patterns can be prevented.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

Figure 1:
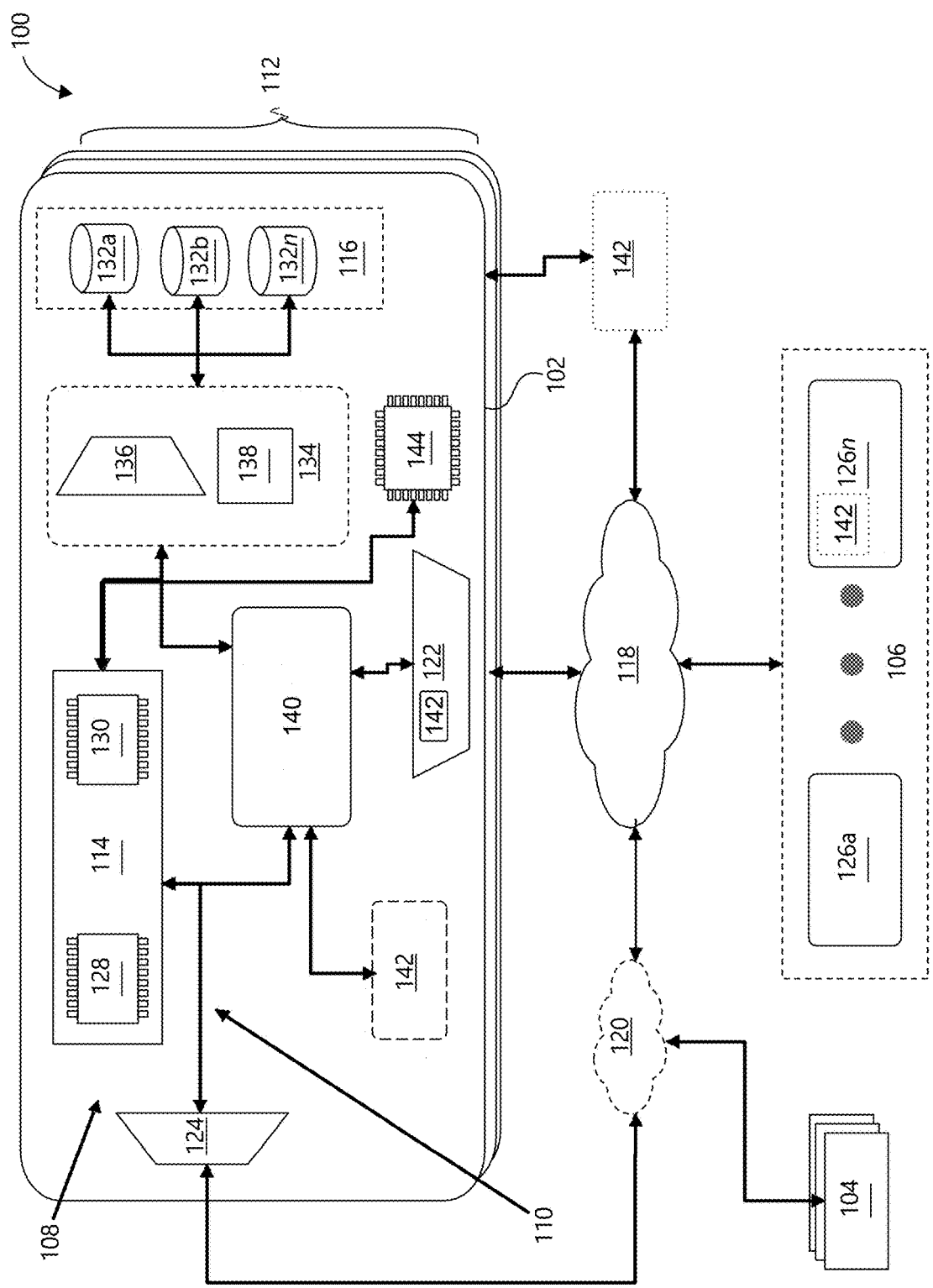
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112 that includes the storage array 102 and one or more other storage arrays.

In embodiments, the storage array 102, components 108, and remote system 104 can include a variety of proprietary or commercially available single or multiprocessor systems (e.g., parallel processor systems). Single or multiprocessor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multiprocessor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that controls access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

In embodiments, a host client machine (e.g., client machine 126n) can include the controller 142. When included in a client machine, the controller 142 can include logic and circuitry configured to perform network communication services over, e.g., the network 118. For example, the controller 142 can disable executable instructions from a network message sent to the storage array 102.

Figure 2:
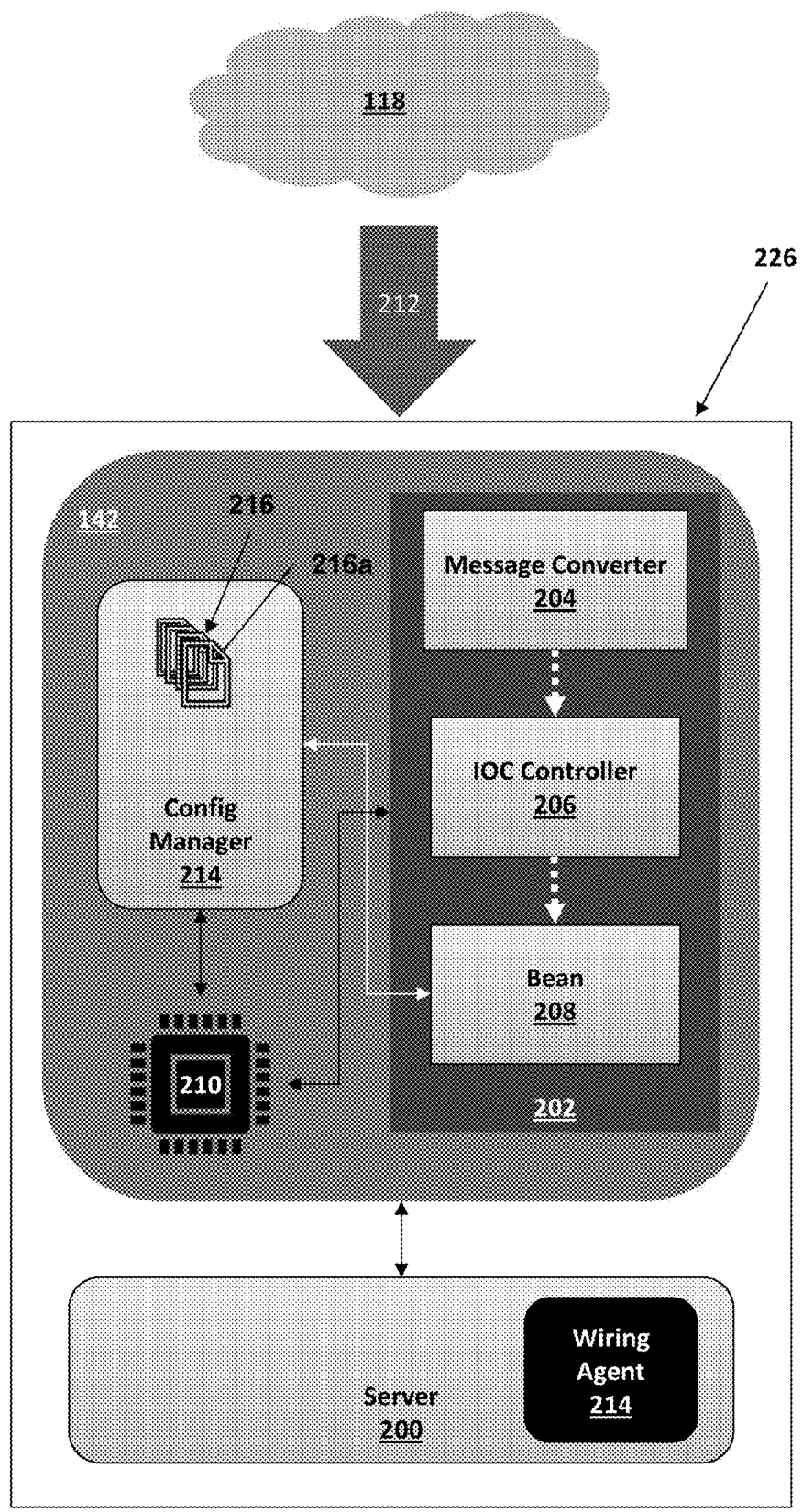
FIG. 2 is a block diagram of a controller in accordance with embodiments of the present disclosure.

Regarding FIG. 2, a storage area network (SAN) 118 can include a host, e.g., client machine 226, which is substantially similar to client machines 126a-n. In embodiments, the client machine 226 can include a network controller 142 and server 200 that receive and process network messages originating from, e.g., a browser client. In addition, the browser client can include one that has provided the client machine 226 with valid client credentials (e.g., login information, authentication tokens, and the like). Further, the network messages can include a Hypertext Transfer Protocol Secure (HTTPS) message 212 with a predefined format required by the server 200. For example, the HTTPS message 212 can include a JSON representation of a server object.

In some circumstances, bad actors, like hackers, can illegally obtain valid client credentials without the corresponding owner's knowledge. In such circumstances, the bad actors can transmit messages that inject malicious auto-executable instructions in HTTPS message fields originating from an authenticated browser client. As described below, the network controller 142 can be configured to remove the malicious auto-executable instructions from the HTTPS message 212.

In embodiments, the network controller 142 can include a Web Application Resource (WAR) interceptor 202 with logic, hardware, and circuitry that intercept and process the HTTPS message 212. For example, the WAR interceptor 202 can include a message converter 204 that serializes the intercepted HTTPS message 212 into an instance of a server messaging class object using, e.g., a reflection technique, as described in greater detail herein. Further, the WAR interceptor 202 can receive wiring services from a wiring agent 214 of the server 200.

In some circumstances, the message converter 204 can require access to additional functionality to process the HTTPS message 212. In embodiments, the network controller 142 can include a local memory 210 that stores one or more beans having corresponding distinct capabilities the message converter 204 can use to enhance its functionality. For example, the local memory 210 can store a security bean 208, including the additional functionality the message converter 204 requires.

In embodiments, the wiring agent 214 can inject an inversion-of-control (IOC) framework controller 206 that delivers injection services for class objects into the message converter 204. Specifically, the wiring agent 214 can use a reference from the message converter 204 to inject the IOC framework controller 206 into the message converter 204. For example, the IOC framework controller 206 can select the security bean 208 from a local memory 210 based on the format of the HTTPS message, the message's target server, and the like. For context and without limitation, the IOC framework controller 206 can include logic and circuitry defining a Contexts and Dependency Injection (CDI) subsystem and the like.

In embodiments, the security bean 208 can be configured to discover the class objects and fields in the HTTPS message 212 using a configuration corresponding to the message 212. For example, the network controller 142 can include a config manager 214 that manages configuration templates 216 stored in the memory 210, isolated from data/content corresponding to the WAR interceptor 202. Specifically, the configuration templates 216 can include definitions for object fields, field types, inheritance hierarchies, and the like. For instance, the security bean 208 can include a reference to a subject configuration template 216a with definitions corresponding to the HTTPS message 212.

Thus, the message converter 204 can transfer the serialized HTTPS message to the security bean 208. For example, the security bean 208 can use the subject configuration template 216a to discover the class objects by comparing each object to one or more configuration templates 216. The security bean 208 can also determine an inheritance hierarchy corresponding to each discovered class object and identify object fields along each discovered class object's inheritance hierarchy via the subject template 216a. Additionally, the security bean 208 can use the subject template 216a to determine each field's structure based on its respective field type.

The security bean 208 can recursively process each field based on its structure and along the inheritance hierarchy of its corresponding class object. In embodiments, the security bean 208 can include instructions to remove characters from fields corresponding to one or more predefined field types. For example, the field types can include container fields such as linked hash maps. After recursively processing a field, the security bean 208 can reassemble the fields with removed characters into a new container field. In addition, the security bean 208 can include instructions that prevent the message converter from removing characters from fields matching one or more predetermined patterns. After reassembling the fields with removed characters, the security bean 208 can generate the serialized message object corresponding to the HTTPS message. Advantageously, any auto-executable instructions in the HTTPS message are now disabled in the serialized message object.

Figure 3:
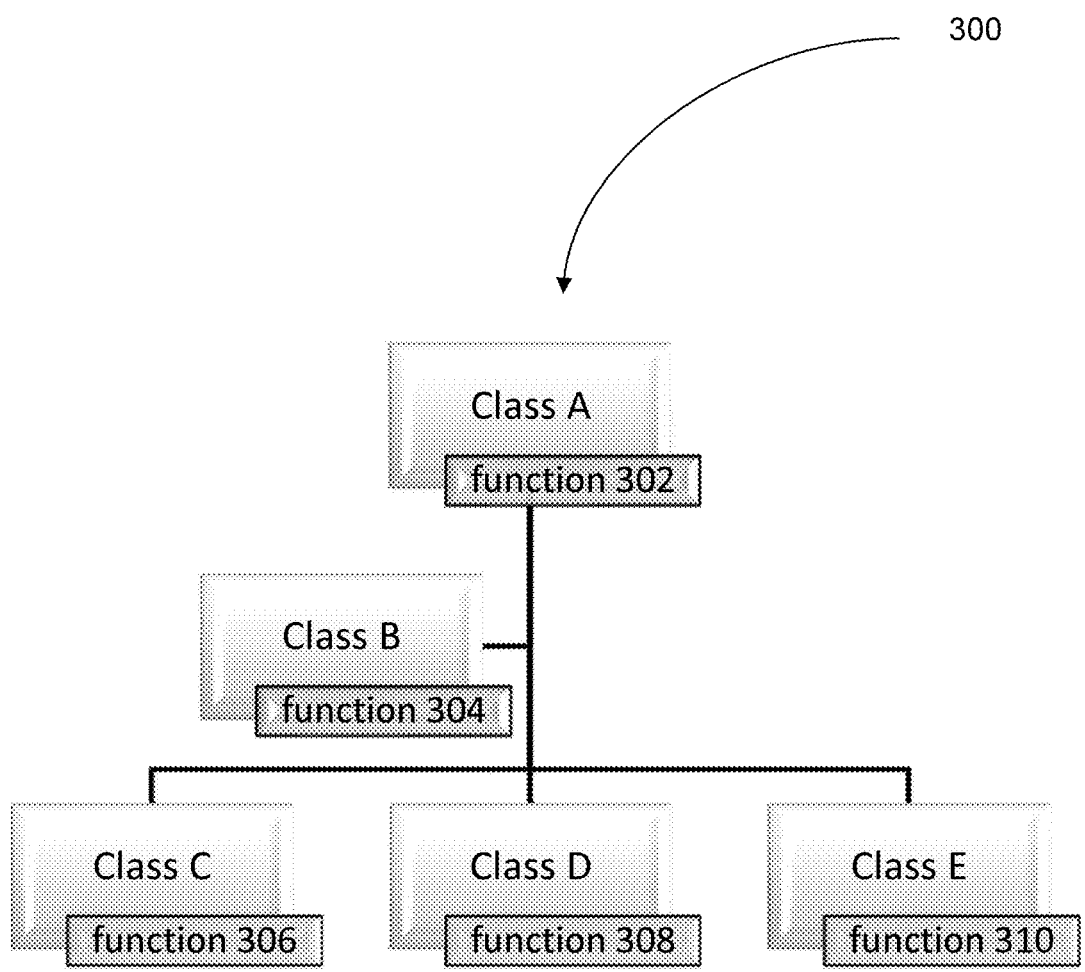
FIG. 3 is a block diagram of an inheritance hierarchy of a class object per embodiments of the present disclosure.

Regarding FIG. 3, a class inheritance hierarchy 300 includes a root or parent class A and child classes B-E. In addition, the classes A-E can include corresponding functions 302, 304, 306, 306, 310. Further, the child classes B-E inherit the functions of their respective parents. For example, child class B includes two functions, function 302, inherited from class A, and function 304, introduced by class B. Likewise, child class D includes three functions, functions 302/304, inherited from class B, and function 308, introduced by class D.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 4:
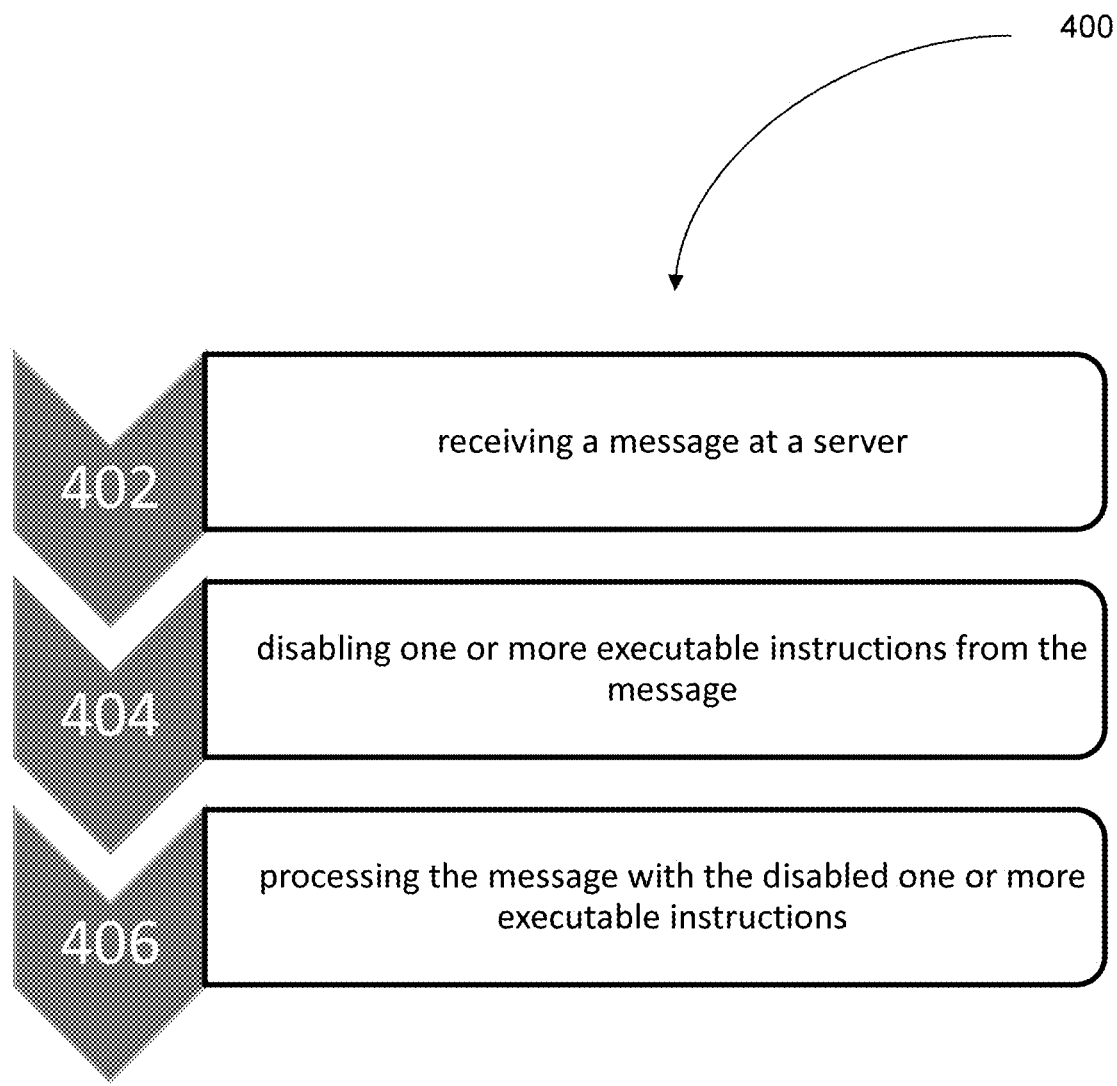
FIG. 4 is a flow diagram of a method for disabling executable instructions from a network message per embodiments of the present disclosure.

Regarding FIG. 4, a method 400 relates to disabling executable instructions from a network message. In embodiments, the controller 142 of FIG. 1 can perform all or a subset of operations corresponding to method 400.

For example, the method 400, at 402, can include receiving a message at a server. Additionally, at 404, the method 400 can include disabling one or more executable instructions from the message. Further, the method 400, at 406, can include processing the message with the disabled one or more executable instructions.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
receiving a message at a server;
disabling one or more executable instructions from the message; and
processing the message with the disabled one or more executable instructions, wherein processing the message includes:
removing characters from fields corresponding to one or more predetermined field types, including container field types, wherein container field types include linked hash maps;
recursively processing each container field type; and
reassembling the fields with removed characters into a new container field.

2. The method of claim 1, further comprising:
receiving the message from an authenticated client, wherein the authenticated client corresponds to a client whose corresponding message includes valid client credentials.

3. The method of claim 1, wherein the message subscribes to a predetermined format.

4. The method of claim 1, further comprising:
receiving the message at a Web Application Resource (WAR) interceptor;
redirecting the message to a message converter; and
injecting a security bean into the message converter using an inversion-of-control (IOC) framework, where the IOC framework includes a Contexts and Dependency Injection (CDI) subsystem.

5. The method of claim 4, further comprising:
serializing the message into a serialized message object, wherein the serialized object is an instance of a server messaging class.

6. The method of claim 5, further comprising:
analyzing the serialized message object using the security bean; and
disabling auto-executable instructions in the serialized object.

7. The method of claim 6, further comprising:
examining each class object in the serialized message object using the security bean.

8. The method of claim 7, further comprising:
identifying each field along an inheritance hierarchy for each class object, wherein identifying each field includes identifying each field's type; and
recursively processing each field based on a structure of each field's type.

9. The method of claim 1, further comprising:
preventing character removal from fields matching one or more predetermined patterns.

10. A system with a memory and a processor, the system configured to:
receive a message at a server;
disable one or more executable instructions from the message; and
process the message with the disabled one or more executable instructions, wherein processing the message includes:
removing characters from fields corresponding to one or more predetermined field types, including container field types, wherein container field types include linked hash maps;
recursively processing each container field type; and
reassembling the fields with removed characters into a new container field.

11. The system of claim 10, further configured to:
receive the message from an authenticated client, wherein the authenticated client corresponds to a client whose corresponding message includes valid client credentials.

12. The system of claim 10, wherein the message subscribes to a predetermined format.

13. The system of claim 10, further configured to:
receive the message at a Web Application Resource (WAR) interceptor;
redirect the message to a message converter; and
inject a security bean into the message converter using an inversion-of-control (IOC) framework, where the IOC framework includes a Contexts and Dependency Injection (CDI) subsystem.

14. The system of claim 13, further configured to:
serialize the message into a serialized message object, wherein the serialized object is an instance of a server messaging class.

15. The system of claim 14, further configured to:
analyze the serialized message object using the security bean; and
disable auto-executable instructions in the serialized object.

16. The system of claim 15, further configured to:
examine each class object in the serialized message object using the security bean.

17. The system of claim 16, further configured to:
identify each field along an inheritance hierarchy for each class object, wherein identifying each field includes identifying each field's type; and
recursively process each field based on a structure of each field's type.

18. The system of claim 10, further configured to:
prevent character removal from fields matching one or more predetermined patterns.

* * * * *